(12) United States Patent  
Gregg (10) Patent No.: US 8,305,879 B2
(45) Date of Patent: Nov. 6, 2012

(54) PERIPHERAL COMPONENT SWITCH HAVING AUTOMATIC LINK FAILOVER (75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 11/694,235

(22) Filed: Mar. 30, 2007

(65) Prior Publication Data
US 2008/0239945 A1 Oct. 2, 2008

(51) Int. Cl.
G06F 11/00 (2006.01)

(52) U.S. Cl. ........................................ 370/217
(58) Field of Classification Search .................. 370/216, 370/217, 218
See application file for complete search history.

(56) References Cited

U.S. PATENT DOCUMENTS

| | | |
|---|---|---|
| 6,112,311 A | 8/2000 | Beardsley et al. |
| 6,128,750 A | 10/2000 | Espy et al. |
| 6,557,121 B1 | 4/2003 | McLaughlin et al. |
| 6,708,283 B1 | 3/2004 | Nelvin et al. |
| 6,839,865 B2 * | 1/2005 | Gould et al. ...................... 714/6 |
| 7,356,636 B2 * | 4/2008 | Torudbakken et al. ........ 710/313 |
| 2001/0023465 A1 | 9/2001 | Haneda et al. |
| 2002/0108012 A1 | 8/2002 | Olarig et al. |
| 2003/0093604 A1 | 5/2003 | Lee |
| 2004/0085893 A1 * | 5/2004 | Wang et al. ................... 370/216 |
| 2004/0123014 A1 | 6/2004 | Schaefer et al. |
| 2004/0148542 A1 | 7/2004 | McAfee et al. |
| 2004/0187106 A1 | 9/2004 | Tanaka et al. |
| 2005/0055484 A1 | 3/2005 | Iskiyan et al. |
| 2007/0206618 A1 * | 9/2007 | Zelig et al. .................... 370/404 |

* cited by examiner

Primary Examiner — Anh-Vu Ly
Assistant Examiner — Mohammad Anwar
(74) Attorney, Agent, or Firm — Scully, Scott, Murphy & Presser, P.C.; Steven Chiu, Esq.

(57) ABSTRACT

Disclosed are a PCI switch assembly, having automatic link failover, and a computer system including that switch assembly. The switch assembly comprises first and second interconnected, peripheral component switches. Each of the these switches has first and second primary ports and a plurality of secondary ports. The switch assembly has a normal mode and a failover mode. In the normal mode, each switch routes data through the switch to the secondary ports of the switch. In the failover mode, a failover path is defined and data are routed from the first switch to the second switch and then to one of the secondary ports of the second switch. The second switch detects a predefined fail condition, and changes the switch assembly from the normal mode to the failover mode in response to detecting the predefined fail condition.

18 Claims, 10 Drawing Sheets

REQUESTOR/COMPLETER ID ROUTING - FAILOVER 1

| BUS NUMBER | SWITCH CHIP 1 | | | | SWITCH CHIP 2 | | | |
|---|---|---|---|---|---|---|---|---|
| | A | B | C | D | A | B | C | D |
| PRIMARY | 0 | 1 | 1 | 1 | 5 | - | 6 | 6 |
| SECONDARY | 1 | 5 | 2 | 3 | 6 | - | 7 | 8 |
| SUBORDINATE | 8 | 8 | 2 | 3 | 8 | - | 7 | 8 |

PCIe AUTOMATIC FAILOVER
- METHOD 2: VENDOR DEFINED MESSAGES -

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | FMT X 1 | | | TYPE | | | | R | TC | | | R | RESERVED | | | TD | EP | ATTR | | R | | | | LENGTH | | | | | | | |
| REQUESTER ID | | | | | | | | | | | | | | | | TAG | | | | | | | | MESSAGE CODE - VENDOR_DEFINED | | | | | | | |
| RESERVED | | | | | | | | | | | | | | | | R | | | | | | | | VENDOR ID | | | | | | | |
| CNTL | | | | | | | | NEXT_RCV_SEQ | | | | | | | | | | | | | | | | NEXT_TRANSMIT_SEQ | | | | | | | |

↰ FAILOVER REQUEST
FAILOVER RESPONSE
FAILOVER PATH # (FOR MORE THAN ONE FAILOVER PATH)

HEADER FOR VENDOR DEFINED MESSAGES

FIG. 13

PERIPHERAL COMPONENT SWITCH HAVING AUTOMATIC LINK FAILOVER

BACKGROUND OF THE INVENTION

1. Field of the Invention

This invention generally relates to computer systems, and more particularly, to switches that link peripheral components to the processors of computer systems. Even more specifically, the invention relates to an automatic failover for such switches.

2. Background Art

Today's computing platforms and processing systems are moving toward an I/O interconnect topology that provides a single communication path between each peripheral device and the host. These computing platforms and processing systems may use packetized communications for communicating between the switching elements within the tree structure. Examples of such computing platforms and processing systems include what is referred to as, for example, peripheral component interconnect (PCI) systems and PCI Express systems. Peripheral devices are discovered by such platforms and systems through an enumeration process performed by a host system element.

A PCI Express compatible switch with multiple ports appears to PCI compatible enumeration and configuration software as a two level hierarchy of PCI-to-PCI bridges. Each switch port appears to the configuration software as a distinct PCI-to-PCI bridge. Each port can support up to eight sub-functions, each sub-function potentially introducing a linked list of supported capabilities. Among the ports, there is an upstream port. The upstream port, which appears to software as a PCI-to-PCI bridge, is the only port through which PCI compatible software can read and/or write the internal configuration registers of the switch. All other ports of the switch, referred to as downstream ports, appear as distinct PCI-to-PCI bridges to the configuration software. As a result, a two-level hierarchy of PCI-to-PCI bridges is formed.

PCI-Express is becoming the standard I/O expansion network. However, its tree structure lacks the ability to have a secondary path for purposes of automatic failover. Multiple paths between hosts and I/O Adapters are required for automatic failover, and new capabilities are needed to be added to PCIe Root Complexes, Switches, and optionally, I/O Adapters to support automatic failover.

SUMMARY OF THE INVENTION

An object of this invention is to provide a peripheral component switch of a computer system with an automatic failover capability.

A further object of the invention is to provide a failover operation, in a peripheral component switch of a computer system, which occurs without any packet loss or software intervention.

Another object of the present invention is to establish cooperative multiple paths between PCIe root complexes and switches (or optionally, I/O adapters) and to use these paths to carry failover traffic in a failover mode.

These and other objectives are attained with a peripheral component switch assembly, having automatic link failover, and a computer system including that switch assembly. The switch assembly comprises first and second peripheral component switches, each of the first and second switches having first and second primary ports and a plurality of secondary ports, and a bus line connecting the second primary port of the first switch with the first primary port of the second switch. The switch assembly has a normal mode and a failover mode. In the normal mode, each switch routes data through the switch from one or more of the primary ports of the switch to the secondary ports of the switch. In the failover mode, a failover path is defined and data are routed from the second primary port of the first switch to the first primary port of the second switch and then to one of the secondary ports of the second switch. The second switch includes means for detecting a predefined fail condition, and means for changing the switch assembly from the normal mode to the failover mode in response to said detecting the predefined fail condition.

In use, data packets are received by the first and second switches, each of the data packets having a sequence number, and two methods are disclosed for keeping track of these sequence numbers in case of a fault condition. In one method, the first primary port of the first switch keeps track of both a normal traffic sequence number and a failover traffic sequence number. In a second method, after the fail condition is detected, messages are sent over the failover path to exchange sequence counts between the first and second switches.

By creating a PCI-Express switch with two (or more) north facing capable ports, both connected to the host through different root complexes (intervening switches are allowed), one port may be operated as the standard PCI-Express north facing port for data transfer while the second (or other) port may be operated in a standby mode. This second port communicates "configuration" information to the host. The second north facing port may take over the normal data transfer when instructed to do so by commands received from the host to either of the north facing ports. Pairs (or more) of these special switches can be interconnected, in which case the second north facing port becomes a south facing port upon failover.

In the preferred embodiment of the invention, described below in detail, the switch to failover mode is done automatically by the hardware. With this preferred embodiment, the hardware performs the failover without losing any transactions and without any visibility to or dependence on any firmware or software.

This is an important aspect of the preferred embodiment of the invention. The failover operation occurs without any actual packet loss or software intervention. All packets lost as a result of the failure are automatically identified and retransmitted without being visible to the software.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The following description and the drawings illustrate specific embodiments of the invention sufficiently to enable those skilled in the art to practice it. Other embodiments may incorporate structural, logical, electrical, process, and other changes. Examples merely typify possible variations.

Figure 1:
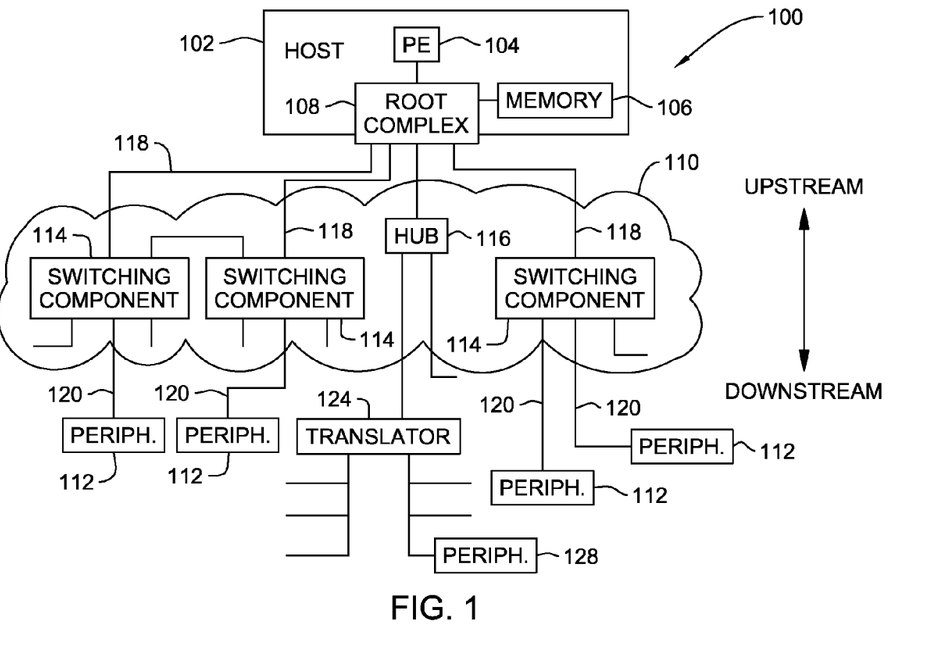
FIG. 1 is a general block diagram of a computer system incorporating switches in accordance with the present invention.

FIG. 1 is a block diagram of a system having an I/O interconnect topology in accordance with an embodiment of the present invention. System 100 may be any computing platform or processing system having an I/O interconnect topology as illustrated, and may utilize packetized communications for internal communications between elements. System 100 may comprise host 102, which may include one or more processing elements (PEs) 104, memory 106 and root complex 108. System 100 may also comprise switching fabric 110 to route packetized communications between root complex and peripheral devices 112. Switching fabric 110 may includes a plurality of switching elements 114 to provide the switching functionality, and may optionally include one or more hubs 116. Switching elements 114 may provide switching functionality in accordance with PCI Express systems.

Communication paths 118 couple root complex 108 with switching elements 114, while communication paths 120 couple switching elements 114 with peripheral devices 112. Communication paths 118 and 120 may provide duplex communications over a physical communication path, and may comprise buses, although this is not a requirement. Although only three switching elements 114 are illustrated in FIG. 1, a system may include many hundred switching elements or more. Translator 124 provides for communications with several peripherals 128 through hub 116.

As used herein, the term "downstream" may be used to refer to communications in the direction from host 102 to peripheral devices 112, while the term "upstream" may be used to refer to communications in the direction from peripheral devices 112 to host 102. Also, although system 100 is illustrated as having several separate elements, one or more of the elements may be combined and may be implemented by combinations of software-configured elements, such as processors including digital signal processors (DSPs), and/or other hardware elements.

Figure 2:
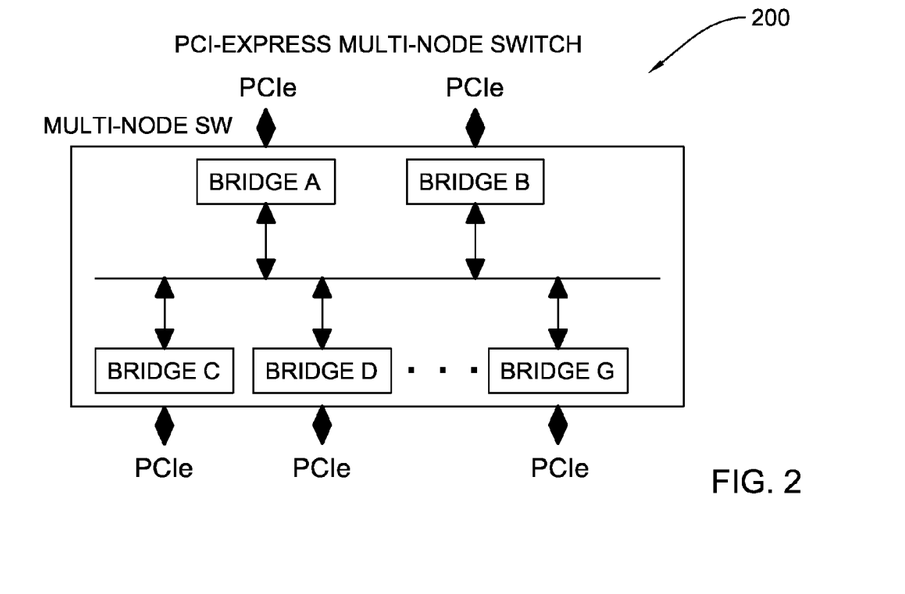
FIG. 2 is a more detailed diagram of a multi node switch used in the present invention.

FIG. 2 illustrates a switching element 200 that may be used in the practice of the present invention, and more specifically, this switching element is a PCI-Express Multi-Node Switch. Switching element 200 includes a pair of primary, or "north," ports A and B, and a series of secondary, or "south," ports C-G. These ports are connected together by a group of buses, as shown in FIG. 2.

Switching element 200 has a number of applications, including a single host, multi-path application; a multi-host, storage application; a double barrel application; and an automatic failover application.

The single host, multi-path application has two modes: a normal mode, and a controlled swap (failed-over) mode. In the normal mode, one primary port owns all secondary ports, and the other primary port is available for minimum access to internal registers. Commands can be routed to/from the active primary port to the inactive primary port.

In the controlled swap (failed-over) mode, one primary port owns all secondary ports, and the second primary port operates as a secondary port. In the double barrel application, two parallel signal paths are provided through the switch. In the automatic failover application, multiple paths are provided from an end point to a host hub. Also, in this automatic failover application, multiple switching elements may be connected together in a ring structure.

Any suitable procedure may be used to design switching element 200. For example, this may be done by starting with a PCI-Express defined switch, adding data paths and controls as required, adding control paths between the ports of the failover points, and adding the desired new data link layer protocols. Also, this design may include starting with a pair of normal root complexes, adding new data link layer protocols, and adding control paths between the ports of the failover points.

In this preferred architecture, all I/O adapters and switches below the failover capable switches use the normally defined PCIe packets. They are not aware of the failover mechanism.

Figure 3:
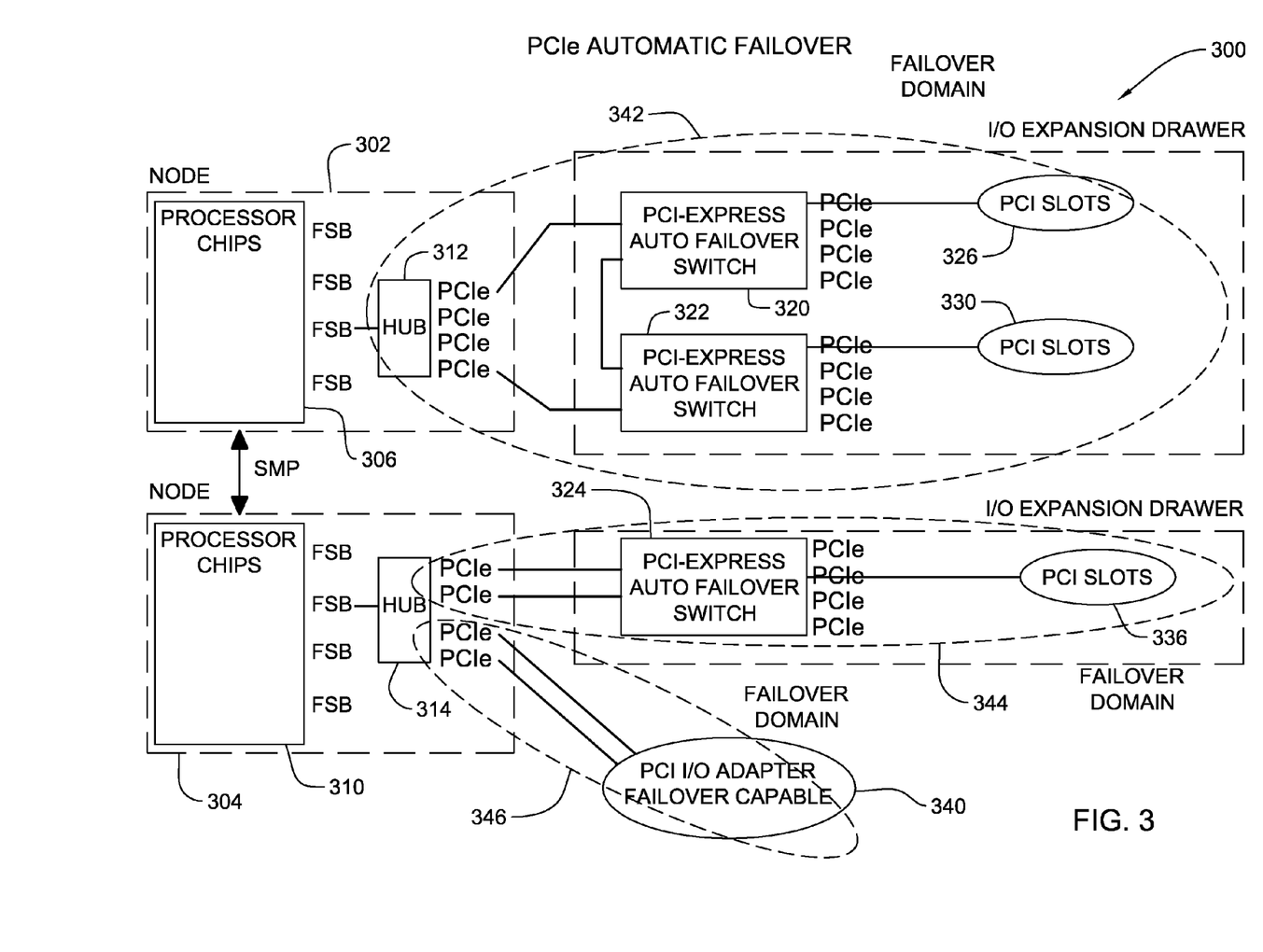
FIG. 3 is a more detailed diagram of a computer system that uses the switches in accordance with the present invention.

FIG. 3 illustrates, in more detail, a computer system 300 in which switching element 200 is used. System 300 of FIG. 3 includes a pair of nodes 302 and 304, each of which includes a group of processor chips 306, 310 and a conventional or standard hub 312, 314. Node 302 is connected to switching elements 320 and 322, and node 304 is connected to switching element 324. Switching element 320, in turn, is connected to PCI slots 326, and switching element 322 is connected to PCI slots 330. Also, switching element 324 is connected to PCI slots 336, and node 304 is directly connected to PCI I/O Adapter 340. As depicted in FIG. 3, a first failover domain 342 includes switches 320 and 322 and PC slots 326 and 330, a second failover 344 domain includes switch 324 and PCI slots 336, and a third failover domain 346 includes PCI I/O Adapter 340.

Each of the switching elements 320, 322 and 324 may be designed as shown at 200 in FIG. 2. As will be understood by those of ordinary skill in the art, system 300 may include additional or alternate items not specifically shown in the drawings or specifically discussed herein. It may also be noted that the example switching elements of FIG. 3 show two north-facing ports and four south facing ports, but more south facing ports may be implemented.

As used in the preferred embodiment of the invention, a Failover Domain is a group of root complexes, switches, and I/O Adapters supporting multiple paths for the purpose of automatic failover. All PCIe bus numbers within the Failover Domain must be unique. All I/O (MMIO) and System memory addresses within the Failover Domain must be unique.

A Failover point is a host, switch, or an I/O Adapter having two or more ports that cooperate to transmit and receive both normal and failover traffic. The ports of the failover point are ideally on the same chip. The ports of the failover point may be on different chips, but logic on the ports must be operational and the ports need to communicate with each other.

A Normal path is a path used for normal traffic, and is between a root complex and one or more PCIe buses (links). A Failover path is the path between two failover points used as the backup path. This path may be the Active path for some PCIe buses while the Failover path for other PCIe buses.

Failover points may be attached to each other by a pair of links (point to point, no switches) or may have an intervening switch (or multiple intervening switches).

Also, preferably the present invention is compatible with all PCIe 1.0 downstream switches and I/O Adapters. Only root complexes and failover points need to understand the new protocol. For configurations with more than two interconnected switches, multiple failover indicators may be required. The first failure determines which traffic is normal and which is failover. For PCIe Bridges in an automatic failover environment, the PCIe routing mechanisms for both Requester ID routing and address routing are extended to control multiple failover modes. Each bridge has multiple sets of routing tables, one for the normal mode and additional tables for the failover modes. During the failover process, and the return to the normal operating mode, the bridges automatically switch among these multiple routing tables. The charts of FIGS. 5, 6, 8, and 9 show this.

Figure 4:
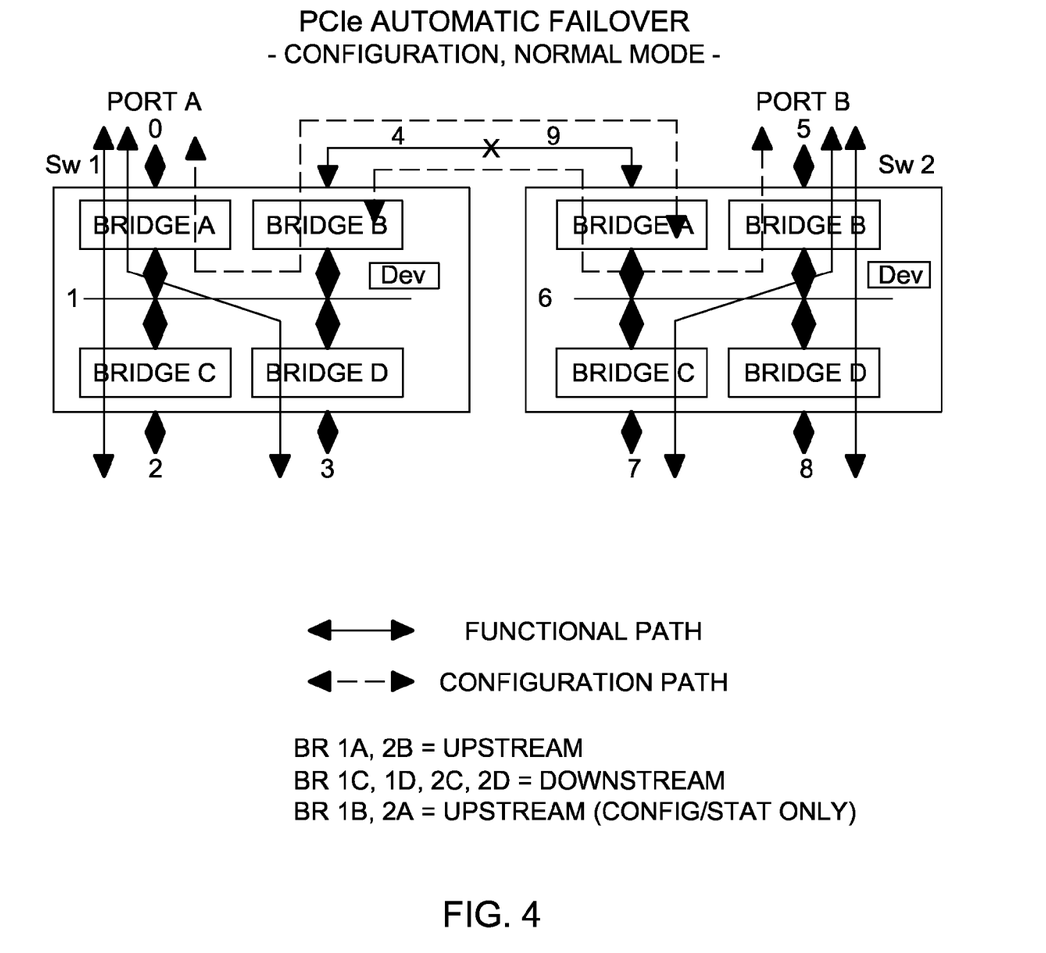
FIG. 4 shows a pair of switches in a normal mode.
Figure 5:
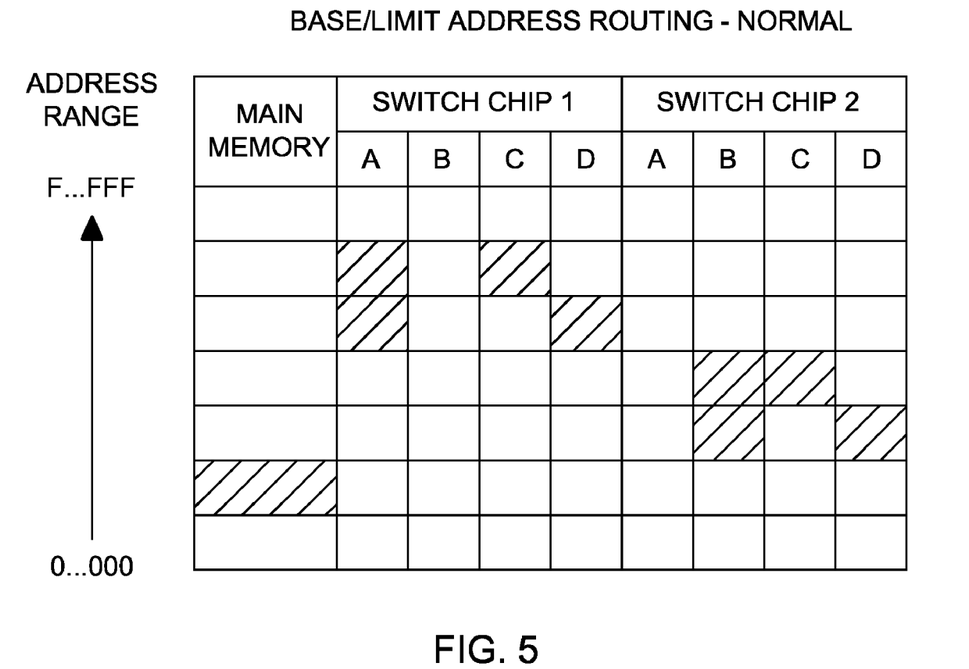
FIG. 5 illustrates an address routing table for the switch pair of FIG. 4.
Figure 6:
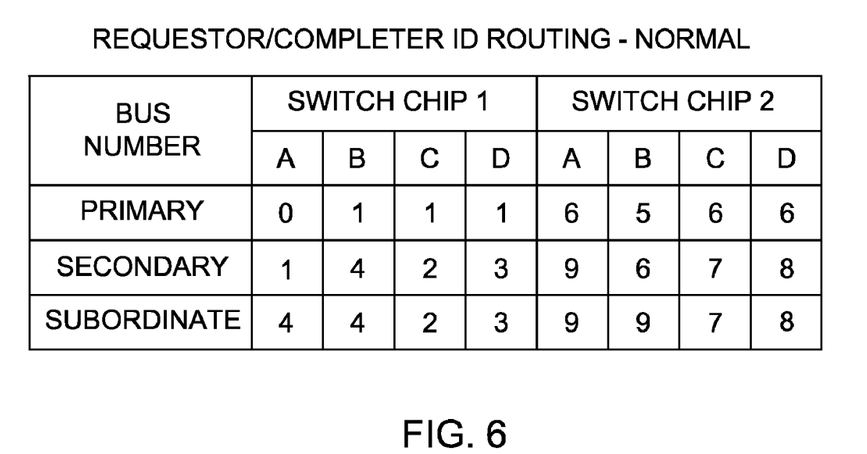
FIG. 6 shows a requestor/completer ID routing table for the switch pair of FIG. 4.
Figure 7:
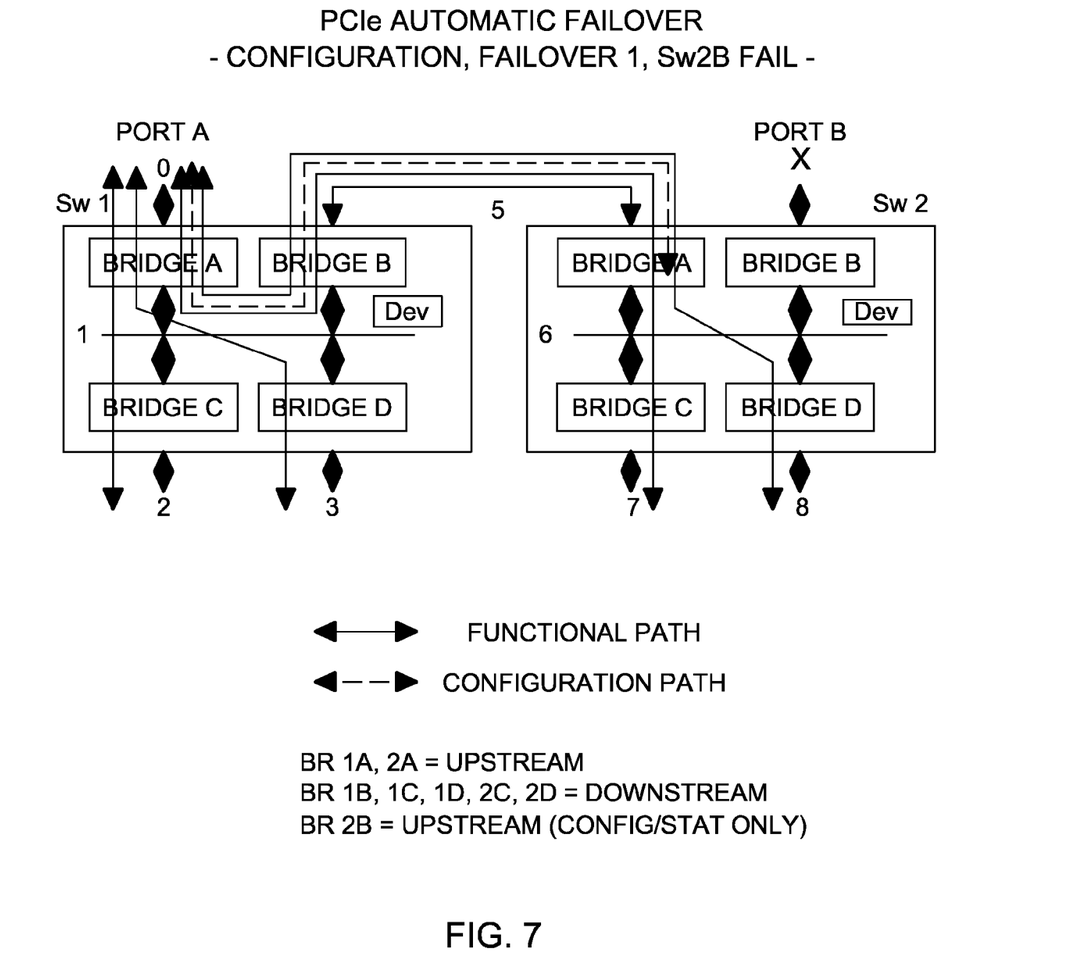
FIG. 7 shows the switches of FIG. 4 in a failover mode.
Figure 8:
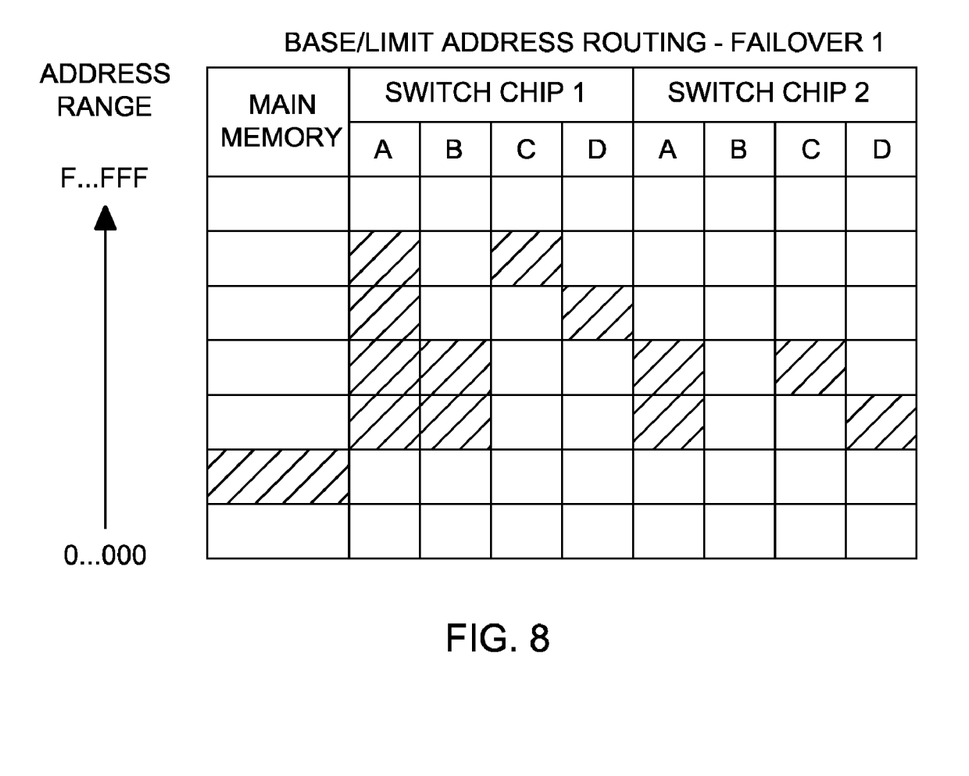
FIG. 8 shows an address routing table for the switch pair of FIG. 7.
Figure 9:
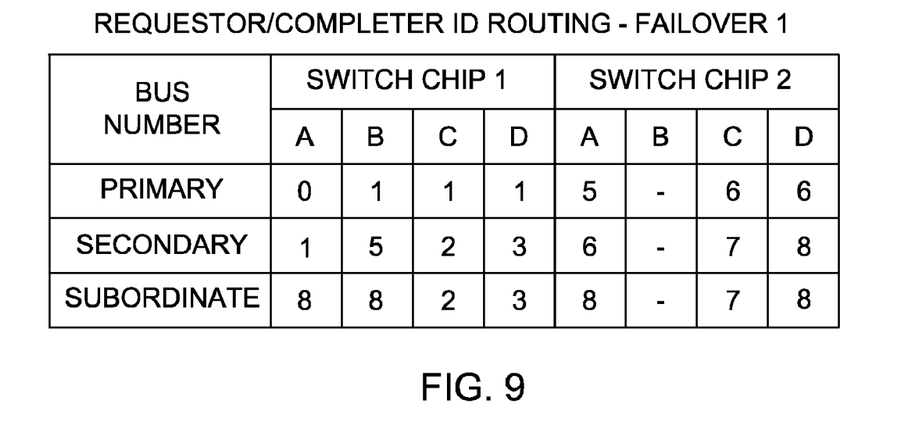
FIG. 9 shows a requestor/completer ID routing table for the switch pair of FIG. 7.

FIG. 4 shows switching elements, referred to as Switch 1 and Switch 2, in a normal mode configuration, and FIG. 7 shows these switching elements in a failover mode configuration. FIG. 5 shows an address routing table and FIG. 6 shows a Requestor/Completer ID routing table for the switches when they are in the normal mode. FIG. 8 shows an address routing table for the switches, and FIG. 9 shows a Requestor/Completer ID Routing table for the switches when they are in the failover mode. Likewise, there is a similar pair of routing tables (not shown) for the failover mode when Port A has failed.

With reference to FIG. 4, the two switches are interconnected and are attached to a single symmetrical multi-processor (SMP). Each switch has two north facing ports, one is attached to the host and the other is interconnected to the second switch. More switches could be configured in a loop, or an I/O Adapter could have two ports. These cases are also covered by this design.

Normally, Switch 1 and Switch 2 operate largely independently. PCIe bus 0 handles functional traffic for buses 2 and 3, and PCIe bus 5 handles functional traffic for buses 7 and 8. The functional traffic is routed by the standard base/limit address and Requester/Completer ID routing. In addition, an interconnection is provided over PCIe bus 4/9. This bus may use a single bus number rather than two, but to make it more symmetrical and easier to illustrate, two bus numbers have been assigned. Port A can write configuration and read status information to Switch 2 over PCIe bus 4, and Port B can do the same to Switch 1 over PCIe bus 9. The key piece of configuration information in each switch is to tell it which ports are in the failure state.

FIG. 7 shows the two switches after a link failure. In particular, as represented in FIG. 7, Switch 1 is in Master Failover mode and Switch 2 is in Slave Failover mode. In failover mode, Switches 1 and 2 are cascaded. Switch 1 (in Master Failover mode) looks like a normal PCI-Express defined switch with one north facing bus (bus 0) and three south facing buses (buses 2, 3, and 5). Switch 2 (in Slave Failover mode) looks almost like a normal PCI-Express defined switch with one north facing bus (bus 5 connected to Switch 1) and two south facing buses (buses 7 and 8). Switch 2, Bridge B is in a 'failure/offline' state, and cannot communicate with Port B. Bus number 4 could be assigned as the primary bus number. The bridges need to have PCIe bus numbers and address During an automatic failover, all outstanding unacknowledged packets are retried by Switch B over the failover path (to port A). Two methods may be use to do this. In the first method, information in the packet headers tells Switch 1 and Port A that these are failover packets, and they may or may not have been successfully sent by Port B. In the second method, messages are sent over the failover path to exchange sequence counts between the failover points.

Figure 10:
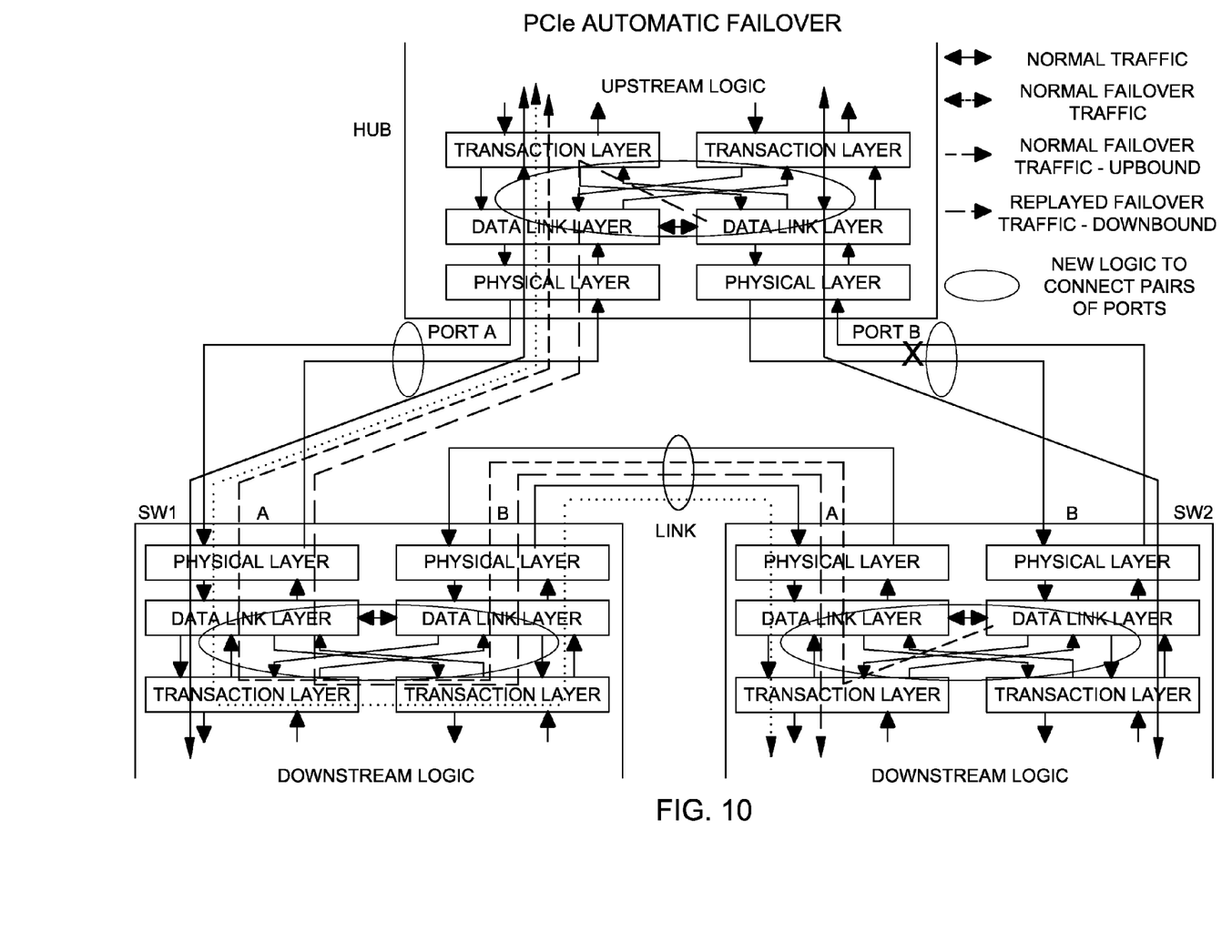
FIG. 10 illustrates the operation of the switch pair in automatic failover mode.
Figure 11:
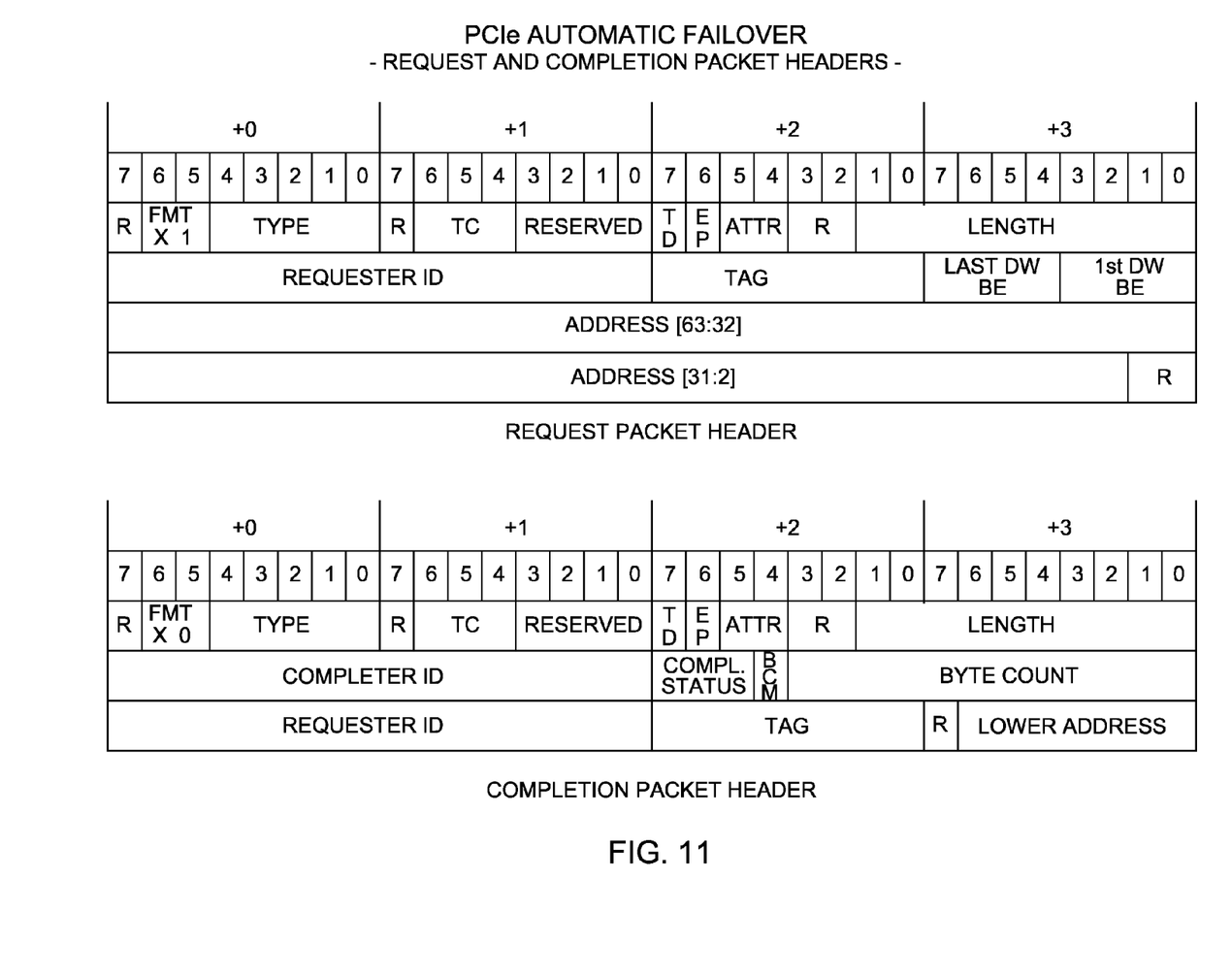
FIG. 11 shows packet headers for use with the switch pair.
Figure 12:
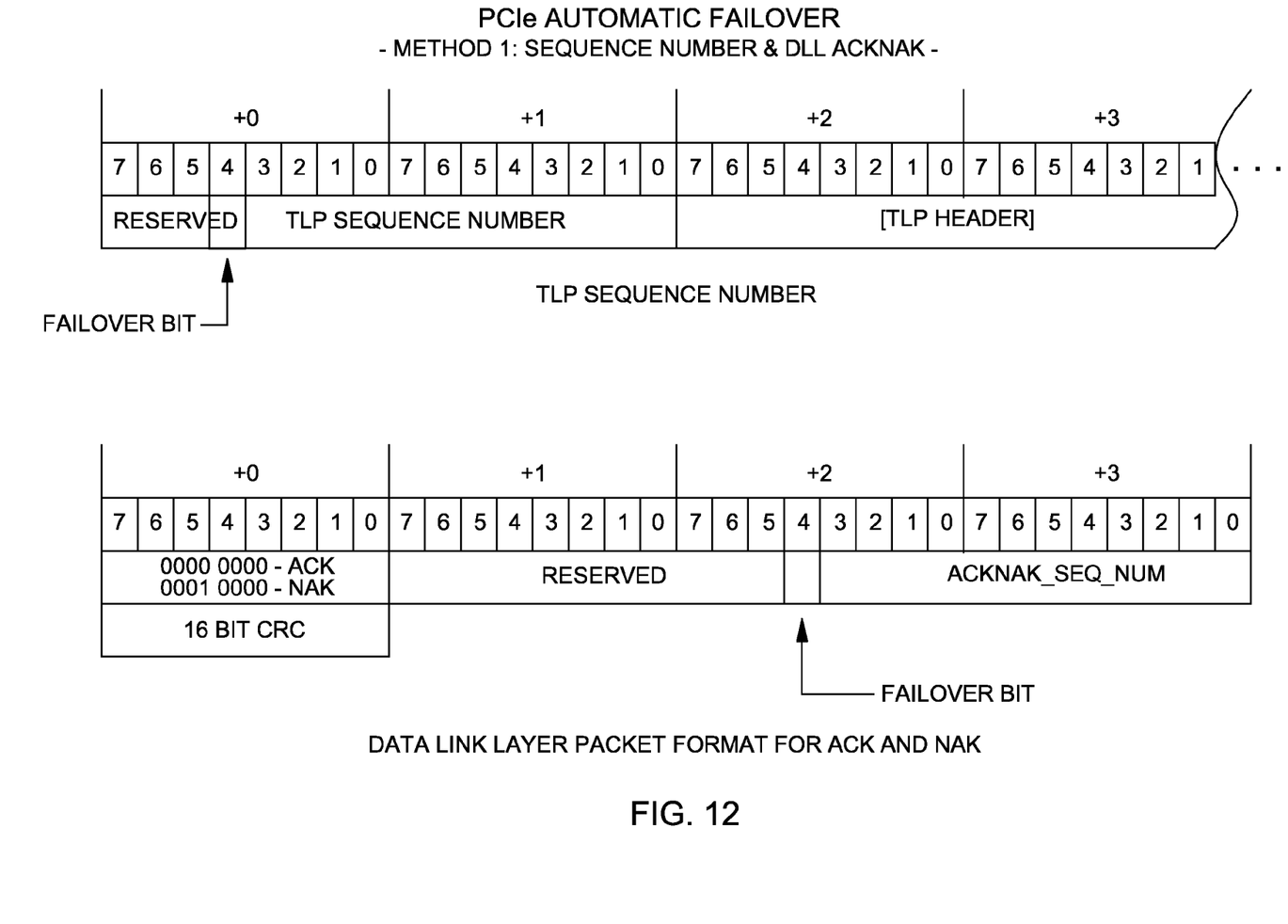
FIG. 12 shows a Transport Layer Packet (TLP) sequence number and a packet format for use with the switch pair.
Figure 13:
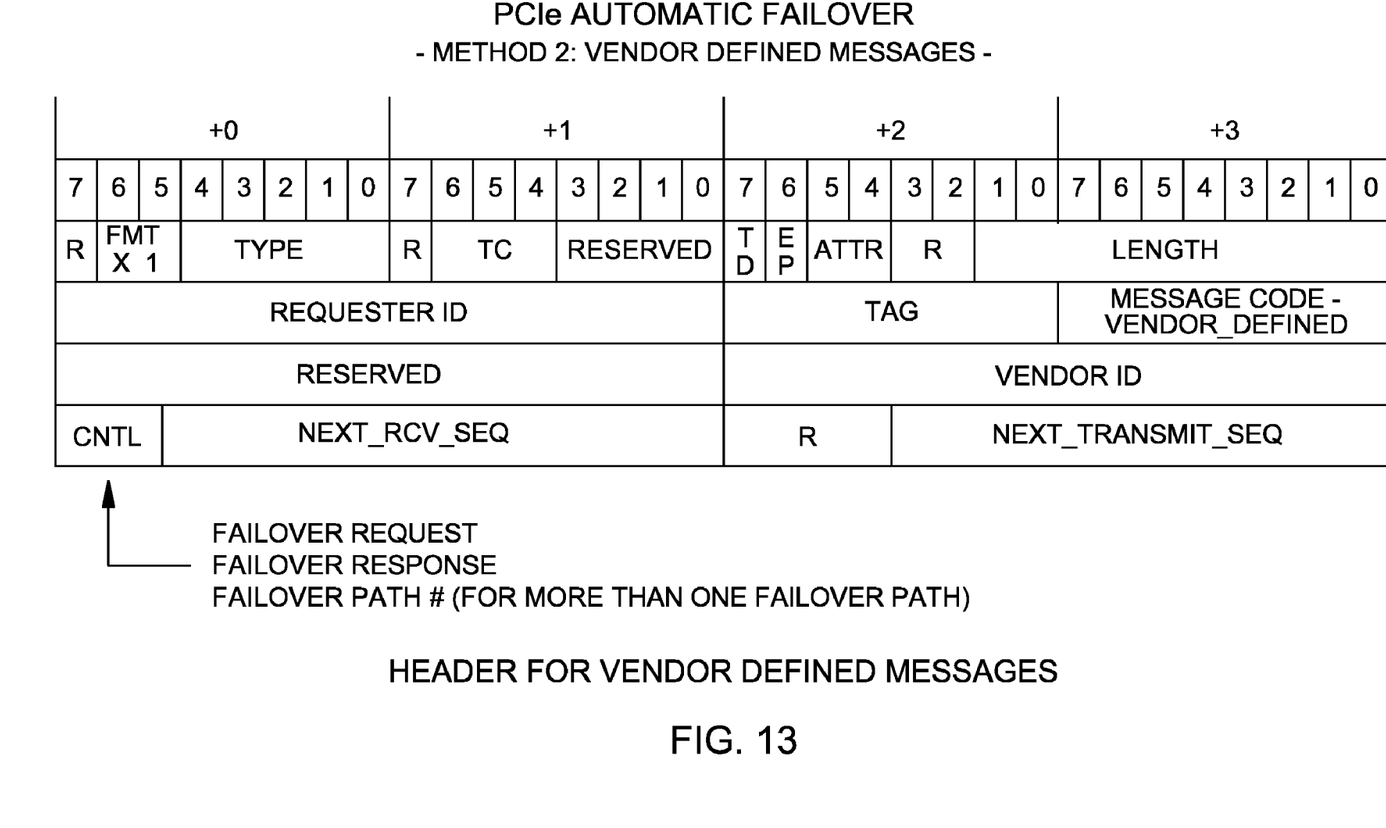
FIG. 13 shows a header for vendor-defined messages for use with the switch pair.

FIG. 10 shows these switches connected to the processor hub. FIG. 11 shows Request and Completion Headers for packets that may be used in the present invention. FIG. 12 shows a Transport Layer Packet (TLP) sequence number and a data link layer (DLL) packet format for Ack and Nak that may be used in the first of the above-described methods. FIG. 13 shows a header for defined messages that may be used in the second of the above-mentioned methods for retrying the unacknowledged packets.

If the link between Switch 2 and Port B becomes operational, software/firmware is responsible for enabling the normal path.

With the preferred switch failover design of the present invention, request and completion (northbound and southbound) traffic are handled independently. The design supports posted requests. Also, because the failed link ports have no knowledge of which packets (if any) were lost when the link failed, the unacknowledged (or NAKed) packets are retransmitted over the failover path.

The retransmitted packets need to have some correlation to the Data Link Layer (DLL) sequence number in the original packet transmitted over the normal (now failed) path. This correlation may be provided in different ways depending on the method used to retry the unacknowledged packets.

With the first of the methods used to retry the unacknowledged packets, each port of a failover point keeps track of both a normal traffic sequence number and a failover traffic sequence number. This can be implemented in several ways. For instance, a bit could be added in the reserved four bits of the high order sequence byte to indicate that this is a failover packet. A corresponding bit could be added to the DLL Ack/Nak packets. Also, the sequence field could be divided into two ranges, one for normal traffic and one for failover traffic.

With the above-mentioned second method for retrying the unacknowledged packets, the messages are sent over the failover path to exchange sequence counts between the failover points.

Also, with the preferred switch failover design of the present invention, the ports of a failover point need to exchange information such as the sequence numbers. Retransmission requires routing the packet through the Transport Layers (TLs) in the failover path.

With the above-mentioned first method for retrying the unacknowledged packets, intervening switches in a failover domain need to forward the failover indicator (new bit or sequence number range), and intervening switches forward the failover sequence number in failover packets (Transport Layer Packets (TLPs) and Data Link Layer Packets (DLLPs)).

In addition, with the preferred switch failover design of this invention, the PCIe order is maintained. Also, the TL of the failover path handles both the normal and failover traffic. Using the TL of the failed path could be done, but it requires a second set of flow control traffic for the TLs of the failed path, and this does not work through the switches. As an alternative, the TL can track Requester IDs and Tags to look for duplicated packets. This may be done by recording the last "N" Requester ID and Tag combinations of the last packets received in the TL. This alternative requires the addition of Tags in Posted Requests (presently a reserved field).

With reference to FIG. 10, in the failover sequence, with the first method for retrying the unacknowledged packets, Switch 2 detects a link failure on port Sw2B. When this occurs, Switch Sw2 generates no new packets on the failed port, ignores all received packets on the failed port, and generates failure messages over the failed link. Also, Switch Sw2 resends any unacknowledged packets to Switch Sw1, via port Sw2A to Sw1B. Switch Sw2 uses the same sequence numbers that the original packets used, indicating the use of the failover path, and uses the TL flow control established over the Sw2A to Sw1B link.

Switch Sw1 receives the failover packets and forwards these onto Hub port A. Switch Sw1 schedules an Ack/Nak indicating a failover packet, and forwards the packet to Hub port A using the Sw1A to Hub port A link using this links' TL flow control. Switch Sw1 also forwards the same sequence number received from Sw2A, and indicates that the packet is a failover packet.

Hub port A receives the failover packet and recognizes that it is a failover packet. In addition, Hub port A puts Hub port B into the link failure state (if this port B is not already in this state), and schedules an ACK/NAK indicating a failover packet. Also, Hub port A gets the NEXT_RCV_SEQ from Hub port B to initialize the failover sequence number protocol and determines if the packet should be forwarded to the TL or discarded. If the packet is to be forwarded to the TL, Hub port A examines Hub port B's TL to see if all write requests have been completed as viewed by the processors.

At approximately the same time, the Hub A detects a link failure on Hub port B. When this occurs, Hub port A generates no new packets on the failed port, ignores all received packets on the failed port, and generates failure messages over the failed link. Also, Hub A resends any unacknowledged packets to Sw1, via Hub port A to Sw1A. Hub A uses the same sequence numbers that the original packets used and indicates the use of the failover path. Hub A also uses the TL flow control established over the Hub port A to Sw1A link.

Switch Sw1 receives the failover packets and forwards them onto Sw2A. Switch Sw1 recognizes the failover packet and separately processes the failover sequence number. Switch Sw2 also schedules an ACK/NAK indicating a failover packet, and forwards the packet to Sw2 using the Sw1B to Sw2A link and using this link's TL flow control. In addition, Switch Sw1 forwards the same sequence number received from Switch Sw1A, and indicates that it is a failover packet.

Also, Switch Sw2 receives the failover packet and recognizes that it is a failover packet. Switch Sw2 puts port Sw2B into the link failure state (if that link is not already in this state), and Switch Sw2 schedules an ACK/NAK indicating a failover packet. In addition, Switch Sw2 gets the NEXT_RCV_SEQ from Sw2B to initialize the failover sequence number protocol and determines if the packet should be forwarded to the TL or discarded. If the packet is to be forwarded to the TL, Switch Sw2 examines Sw2B's TL to see if all write requests have been completed as viewed by the I/O Adapter. Switch Sw2 strips the failover indicator before passing the packet down to the PCIe bus.

In the return sequence, under firmware/software control, the link between Hub port B and Switch Sw2B becomes operational. The receivers at each end of the link are now ready to receive packets, and flow control (FC) is established. The firmware instructs each end of the link to start transmitting normal packets. This also enables a subsequent failover event.

Both transmitters on the link between Hub port B and Sw2B start to send normal packets. The failover path is disabled and the normal path is used to send the next packet with the NEXT_TRANSMIT_SEQ number that the failover packet stream was using. The transmitters on the link between Sw1B and Sw2A continue to forward failover traffic, but these packets will be ignored.

The receivers on the link between Hub port B and Switch Sw2B start to receive normal packets. The receivers get the NEXT_RCV_SEQ from the failover DLL to initialize the normal sequence number protocol and determine if the packet should be forwarded to the TL, discarded or NAKed.

Automatic failover is re-enabled for subsequent failures on the link between Hub port B and Sw2B as soon as the transmitters are enabled for packet receptions.

With the second method for retrying the unacknowledged packets, in the failover sequence, Switch Sw2 detects a link failure on port Sw2B. When this happens, Switch Sw2 generates no new packets on the failed port and ignores all received packets on the failed port. Also, Switch Sw2 generates failure messages over the failed link, and waits for any posted requests to complete. Switch Sw2 sends a message over the failover path (from Sw2A to Sw1B to Sw1A) to Hub port A. Switch Sw2 informs Hub port A of the Sw2B failure, and Sw2B's NEXT_TRANSMIT_SEQ and NEXT_RCV_SEQ numbers.

Hub port A receives the notification. Hub port A puts Hub port B into the link failure state (if that port is not already in this state). Hub port A examines Hub port B's TL to see if all write requests have been completed as viewed by the processors. Also, Hub port A gets Hub port B's NEXT_TRANSMIT_SEQ and NEXT_RCV_SEQ numbers, and sends this information over the failover path (from Hub port A to Sw1A to Sw1B to Sw2A) back to Sw2B.

Switch Sw2 receives the reply and knows which packets, if any, in the Sw2B port's DLL replay buffer to resend over the failover path. The failover traffic is merged with the normal traffic using sequence numbers from a common pool.

This procedure is described for the upbound traffic, but it may be used in the downbound direction also. The protocol may require requests and responses in each direction before retransmission.

In the return sequence, under firmware/software control, the link between Hub port B and Sw2B becomes operational. The receivers at each end of the link are now ready to receive packets and FC is established, etc.

Return messages are exchanged between Failover points. The firmware instructs each end of the link to start transmitting normal packets. This also enables a subsequent failover event.

Both transmitters on the link between Hub port B and Sw2B start to send normal packets. The failover path is disabled and the normal path is used to send the next packet with the same NEXT_TRANSMIT_SEQ number stream.

The receivers on the link between Hub port B and Sw2B start to receive normal packets. The receivers get the NEXT_RCV_SEQ from the failover DLL to initialize the normal sequence number protocol and determine if the packet should be forwarded to the TL, discarded, or NAKed.

Here too, automatic Failover is re-enabled for subsequent failures on the link between Hub port B and Sw2B as soon as the transmitters are enabled for packet reception.

The preferred embodiment of the invention, described above in detail, has a number of important advantages. For example, one important advantage is that the failover operation occurs without any actual packet loss or software intervention. All packets lost as a result of the failure are automatically identified and retransmitted without being visible to the software.

Also, it is an advantage of this embodiment that the switches operate in transparent mode. In this mode, the PCIe packets pass through the switches unaltered, especially the memory addresses and Requester IDs in the packets. Transparent switches have the reliability and error detection advantage by preserving the End-to-End CRC from end point to end point. This is in contrast to non-transparent switches where memory address, Requester IDs, and other fields in the packets may be translated or altered. These alterations to the packet headers required the switches to recalculate the End to end CRC, and this recalculation makes the system more susceptible to undetected switch generated errors.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A peripheral component switch assembly having automatic link failover, comprising:
    first and second peripheral component switches, each of the first and second switches having first and second primary ports and a plurality of secondary ports;
    a bus line connecting the second primary port of the first switch with the first primary port of the second switch;
    wherein the switch assembly has a normal mode, in which each switch routes data through the switch from one or more of the primary ports of the switch to the secondary ports of the switch, and a failover mode, in which a failover path is defined and data are routed from the second primary port of the first switch to the first primary port of the second switch and then to one of the secondary ports of the second switch; and
    wherein the switch assembly changes from the normal mode to the failover mode in response to a detection of a predefined fail condition;
    wherein, in use, the first and second switches send data packets to a processor node; and
    wherein, when said predefined fail condition is detected, said second switch sends a group of the data packets to the first switch, over the failover path, for sending to the processor node.

2. A switch assembly according to claim 1, wherein:
    each of the data packets has a sequence number;
    the first primary port of the first switch keeps track of both a normal traffic sequence number and a failover traffic sequence number for the data packets.

3. A switch assembly according to claim 1, wherein, in response to said fail condition being detected, the second switch:
    generates no new packets on the second primary port of the second switch;
    ignores all received packets on the second primary port of the second switch; and
    generates failure messages over the second primary port of the second switch.

4. A switch assembly according to claim 3, wherein said group of data packets comprise unacknowledged data packets sent by the second switch before the fail condition is detected.

5. A switch assembly according to claim 4, wherein after said fail condition is detected, the first switch sends said any unacknowledged packets to the processor node.

6. A switch assembly according to claim 1, wherein:
    after the fail condition is detected, messages are sent over the failover path to exchange sequence counts for the data packets between the first and second switches.

7. A computer system comprising:
    a host processor unit;
    a plurality of peripheral devices; and
    a plurality of signal paths connecting the peripheral devices to the host processor unit, said plurality of signal paths including at least one pair of interconnected switches, each of said switches having first and second primary ports and a plurality of secondary ports;
    wherein said switch pair has a normal mode, in which each switch routes data through the switch from one or more of the primary ports of the switch to the secondary ports of the switch, and a failover mode, in which a failover path is defined and data are routed from the second primary port of the first switch to the first primary port of the second switch and then to one of the secondary ports of the second switch; and
    wherein the switch pair changes from the normal mode to the failover mode in response to a detection of a predefined fail condition;
    wherein, in use, the first and second switches send data packets to a processor node; and
    wherein, when said predefined fail condition is detected, said second switch sends a group of the data packets to the first switch, over the failover path, for sending to the process node.

8. A computer system according to claim 7, wherein:
    each of the data packets has a sequence number;
    the first primary port of at least one of the switches keeps track of both a normal traffic sequence number and a failover traffic sequence number for the data packets.

9. A computer system according to claim 7, wherein, in response to said fail condition being detected, said second switch:
    generates no new packets on the second primary port of said second switch;
    ignores all received packets on the second primary port of said second switch; and
    generates failure messages over the second primary port of said second switch.

10. A computer system according to claim 9, wherein said group of data packets comprise unacknowledged packets sent by said second switch before the fail condition is detected.

11. A computer system according to claim 10, wherein after said fail condition is detected, the first switch sends said unacknowledged packets to the processor node.

12. A computer system according to claim 7, wherein:
    after the fail condition is detected, messages are sent over the failover path to exchange sequence counts between said pair of switches.

13. A method of operating a pair of PCI-Express switches having automatic link failover, wherein each of said pair of switches has first and second primary ports and a plurality of secondary ports; and wherein the switch pair has a normal mode, in which each switch routes data through the switch from one or more of the primary ports of the switch to the secondary ports of the switch, and a failover mode, in which a failover path is defined and data are routed from the second primary port of the first switch to the first primary port of the second switch and then to one of the secondary ports of the second switch; said method comprising the steps of:
    detecting a predefined fail condition; and
    the first and second switches sending data packets to a processor node; and
    changing the switch pair from the normal mode to the failover mode in response to said detecting the predefined fail condition, and when said predefined fail condition is detected, said second switch sending a group of the data packets to the first switch, over the failover path, for sending to the processor node.

14. A method according to claim 13, wherein each of the data packets has a sequence number;

and the method comprising the further step of:

the first primary port of at least one of the switches keeping track of both a normal traffic sequence number and a failover traffic sequence number for the data packets.

15. A method according to claim 13, wherein, in response to detecting fail condition, said second switch:

generating no new packets on the second primary port of the second switch;

ignoring all received packets on the second primary port of the second switch; and generating failure messages over the second primary port of the second switch.

16. A method according to claim 15, wherein said group of data packets comprise unacknowledged packets sent by said second switch before detecting the fail condition.

17. A method according to claim 16, comprising the further step of, after detecting said fail condition, said first switch sending said any unacknowledged packets to the processor node.

18. A method according to claim 13, comprising the further step of:

after the fail condition is detected, sending messages over the failover path to exchange sequence counts for the data pockets between the first and second switches.

* * * * *